United States Patent [19]

Doetzer et al.

[11] Patent Number: 4,950,551

[45] Date of Patent: Aug. 21, 1990

[54] GAS BARRIER LAYER FOR METALLIC AND NONMETALLIC MATERIALS

[75] Inventors: Richard Doetzer; Georg Iwantscheff, both of Nuernberg, Fed. Rep. of Germany

[73] Assignee: Siemens Aktiengesellschaft, Berlin & Munich, Fed. Rep. of Germany

[21] Appl. No.: 250,946

[22] Filed: Sep. 29, 1988

[30] Foreign Application Priority Data

Sep. 29, 1987 [DE] Fed. Rep. of Germany ....... 3732806

[51] Int. Cl.$^5$ .................. B32B 15/04; B32B 15/20
[52] U.S. Cl. ................................. 428/624; 428/630; 428/650
[58] Field of Search ..................... 428/624, 630, 650

[56] References Cited

FOREIGN PATENT DOCUMENTS

| | | |
|---|---|---|
| 0044668 | 1/1982 | European Pat. Off. . |
| 2146346 | 3/1973 | Fed. Rep. of Germany . |
| 3104161 | 8/1982 | Fed. Rep. of Germany . |
| 3111369 | 11/1982 | Fed. Rep. of Germany . |
| 2020699 | 11/1979 | United Kingdom . |

*Primary Examiner*—T. M. Tufariello
*Attorney, Agent, or Firm*—Kenyon & Kenyon

[57] ABSTRACT

The invention provides a high-purity electroaluminum layer having a purity of greater than 99.99% and, preferably, a thickness of 10 to 20 $\mu$m which serves as a gas barrier layer, particularly for hydrogen, oxygen, tritium and water vapor, for metallic materials and nonmetallic materials such as glass, quartz, ceramic and cermets with an electroconductive surface as well as for conductive plastics. By post-treatment, the electroaluminum layer can be compacted. The electroaluminum layer is precipitated by electroplating from aprotic oxygen-free and anhydrous electrolyte media of the general formula $M^I X.2AlR_3.nLsm$, wherein $M^I$ is an alkali metal ion or a quaternary onium ion, X is a halogen ion, preferably $F^-$ or $Cl^-$, R is an alkyl radical, preferably $CH_3$, $C_2H_5$, $C_3H_7$ or $C_4H_9$, Lsm is an aromatic solvent molecule, preferably toluene, ethyl benzene, xylene or a mixture thereof, and n=0 to 12, at a bath temperature of 50° to 110° C. and a current density of 0.5 to 10 A/dm$^2$ under intensive bath agitation. Electroplating may be conducted in the presence of an aromatic solvent.

3 Claims, No Drawings

GAS BARRIER LAYER FOR METALLIC AND NONMETALLIC MATERIALS

BACKGROUND OF THE INVENTION

The invention relates to a gas barrier layer for metallic and nonmetallic materials and to a method for the production of such a gas barrier layer.

For metallic dies, a pore-free electroplated coating of copper, zinc or nickel is sometimes used as gas barrier for hydrogen or tritium. For reliable protection, however, layers greater than 100 um thick made of these metals are not sufficient because the gases are rather readily mobile in the metal structures at temperatures as low as 100° C.

From DE-OS No. 21 46 346 it is known to provide a layer of aluminum or aluminum alloy as a hydrogen diffusion barrier for nuclear reactor fuel rods between the nuclear fuel and the tubular envelope. The melting point of the alloy should, if possible, be substantially higher than the nuclear fuel operating temperature. The function of the layer of aluminum or aluminum alloy is to achieve, at absolute mechanical stability (particularly in the cold state), a satisfactory hydrogen diffusion barrier for the entire useful life of the fuel rods.

It is an object of the present invention to provide a barrier layer for gases, particularly hydrogen and its isotopes, on surfaces of shaped parts and components made of metallic materials and of nonmetallic materials with an electroconductive surface, which is impermeable and firmly adheres to the materials and which prevents any escape of gases from the materials or penetration into them.

It is a further object of the invention to provide a barrier layer for gases which is effective at elevated service or operating temperatures.

SUMMARY OF THE INVENTION

The invention provides a high-purity electroplated aluminium layer, i.e. electroaluminum layer having a purity of greater than 99.99% and, preferably, a thickness of 10 to 20 μm which serves as a gas barrier layer, for metallic materials and nonmetallic materials with an electroconductive surface such as glass, quartz, ceramic and cermets as well as for conductive plastics. The electroaluminum layer provides a barrier for gases and is particularly effective for hydrogen, oxygen, tritium and water vapor. By post-treatment, the electroaluminum layer can be compacted. The electroaluminum layer is precipitated by electroplating from an aprotic oxygen-free and anhydrous electrolyte media of the general formula $M^IX.2AlR_3.nLsm$, wherein:

$M^I$ is an alkali metal ion or a quaternary onium ion,

X is a halogen ion, preferably $F^-$ or $Cl^-$,

R is an alkyl radical, preferably $CH_3$, $C_2H_5$, $C_3H_7$ or $C_4H_9$,

Lsm is an aromatic solvent molecule, preferably toluene, ethyl benzene, xylene or a mixture thereof, and n=0 to 12.

Electroplating may be conducted in the presence of an aromatic solvent, at a bath temperature of 50° to 100° C. and a current density of 0.5 to 10 A/dm$^2$, under intensive bath agitation.

DETAILED DESCRIPTION OF THE PREFERRED EMBODIMENT

The unusually ductile, high-purity electroaluminum having a purity of greater than 99.99% Al has proven to be an excellent gas barrier layer material. As a result of the electrocrystalline electrodeposition process, the gas barrier is impermeable and adheres firmly on metallic surfaces and on surface areas that ar nonmetallic but have been made conductive. The electroaluminum gas barrier layer of the invention are also free from hydrogen, oxygen and moisture and the substrate materials are not contaminated or corroded by such gases. Gases of the aforesaid kind do not penetrate into materials coated with the electroaluminum gas barrier. The gas barrier of the invention prevents hydrogen embrittlement (the prevention of which is technically important for many steel materials) and oxidation (i.e., contamination caused by oxide or hydroxide). The electroaluminum gas barrier layer of the invention also protects the materials which it coats generally against intrusion, penetration and in-diffusion of gases, particularly against the intrusion of the "thinnest" of all gases, hydrogen, and the isotopes thereof, deuterium and radioactive tritium. Even against hydrogen, the gas barrier layer of the invention opposes penetration and diffusion at temperatures of up to about 300° C. The barrier layer constitutes a total barrier for the "thicker" isotopes $D_2$ and $T_2$.

Similarly, the gas barrier layer of the invention also prevents in-diffusion as well as out-diffusion of the gases oxygen, nitrogen, carbon monoxide, carbon dioxide, sulfur dioxide and ammonia as well as water vapor and hydrogen sulfide and also of hydrocarbons including their isotope derivatives, for instance, $D_2O$, HDO, $T_2S$, $ND_3$ and $C_2D_6$.

The production of the gas barrier layer on metallic materials and on nonmetallic materials with an electroconductive surface is accomplished, according to the invention, in the following manner. The electroconductive surfaces of the materials are electroplated with electroaluminum in an aprotic, oxygen-free and anhydrous aluminum-organic electrolyte medium of the general formula $M^IX.2AlR_3.nLsm$, wherein:

$M^I$ is an alkali metal ion or a quaternary onium ion,

X is a halogen ion, preferably $F^-$ or $Cl^-$,

R is an alkyl radical, preferably $CH_3$, $C_2H_5$, $C_3H_7$ or $C_4H_9$,

Lsm is a molecule of an aromatic solvent, preferably toluene, ethyl benzene or xylene or a mixture thereof, and n=0 to 12, at bath temperatures of 50° to 110° C. and a current density of 0.5 to 10A/dm$^2$. The electrolyte medium may be in the presence of an aromatic solvent. The process is preferably conducted under intensive bath agitation. At these low plating temperatures, interfering influences and alterations of the material structure that would impair material properties such as hardness, elasticity and strength, are avoided.

Metallic surfaces can be electroplated directly after the usual material-specific cleaning. Nonmetallic surfaces can be electroplated after material-specific cleaning and precoating with a thin 0.1 to 2 μm thick conductive layer of aluminum or other suitable metal or of graphite or conductive carbon. The thin conductive intermediate layer is preferably applied by a currentless, reductive-chemical method or by thermal degradation of vaporizable compounds, particularly organometal compounds.

The electroaluminum layer applied according to the invention, which preferably has a thickness of 10 to 20 $\mu$um, can be post-treated chemically or mechanically. The mechanical post-treatment can be done, for example, by drumming with hard material or blasting with glass beads, whereby further compacting of the electroaluminum crystallites is achieved. The chemical post-treatment can be done by fluoridizing with HF vapor or by oxidizing with hot air or superheated water vapor, with formation of $AlF_3$ or superficial $AlO(OH)$. For the coating of beam waveguide glass and quartz fibers, a suitable coating is provided by chemical-reductive degradation or by thermal degradation of dissolved or evaporated metal compounds, particularly of organometal compounds such as $Al(iC_4H_9)_3$, $In(C_2H_5)_3$, $Ni(CO)_4$ and $CH_3Au:P(CH_3)_3$, as well as of certain hydrocarbons, such as n-heptane, in a thin layer.

Gas barrier layers according to the invention can be used on surfaces and intermediate layers of shaped parts and structural parts of metal and nonmetal to prevent permeation of hydrogen and its isotopes, of oxygen and moisture and of the above named gases as well as of many other mono- and multi-atom gas molecules and also of water vapor. Such layers are especially useful for surface protection of beam waveguides and overvoltage arresters, mainly when overvoltage arresters are tritium-doped.

The invention can be understood in greater detail with reference to the following examples.

EXAMPLE 1

Encapsulation of $T_2$-Doped Overvoltage Arresters by Coating on All Sides with an Electroaluminum Layer about 12 um Thick As the name or designation "overvoltage arrester" indicates, its function is to protect electrical equipment and installations against overvoltages, which may occur, for example, in switching or due to lightning. The arrester must go into operation when a dangerously high overvoltage strikes it, and must lead the current off to ground. However, it must be able to avoid complete collapse of the voltage because of the functionality of the equipment or installation protected by it.

Due to the radioactivity (beta radiator with a half life of 12.3 years), tritium-doped overvoltage arresters permit an advantageous adjustment of the resistance characteristic of the overvoltage arrester, but in order to conserve the quantity of tritium, and for safety reasons, the arresters must be encapsulated. The surface of the cylindrical encapsulation of a $T_2$-doped overvoltage arrester consists of nickel, which, like copper, allows hydrogen, deuterium and tritium to diffuse through.

The cylindrical encapsulation of a $T_2$-doped overvoltage arrester, is coated in an aluminum-organic electrolyte at about 100° C. and a current density of 2 $A/dm^2$ with agitation of the bath. The electroaluminum layer obtained, about 12 um thick, lets no tritium escape up to about 300° C. Normally the overvoltage arrester is at room or ambient temperature; it is briefly heated to about 80° C. only when it goes into operation.

Because of the radioactivity of the $T_2$, it is easy to measure $T_2$ diffusing through the electro-Al gas barrier layer with the use of a Geiger counter in the issuing air stream. The encapsulated structural part is arranged in a tube traversed by an air stream to measure or determine the penetrating quantity as a function of the test temperature.

Using the above described test setup, it was found that the electro-Al layer still has pores which let gas through up to a thickness of about 8 $\mu$um, but that a layer thickness of about 12 $\mu$m provides a reliable gas barrier layer which proves to be impermeable even at the above named higher temperatures.

By drumming the aluminum-plated component cylinders with Al-oxide ceramic balls of a diameter of 3 to 5 mm, the crystalline accretion of the electro-Al structure can be compacted. Gasproofness to tritium can then be obtained with a smaller layer thicknesses.

The gas barrier effect of the electro-Al coating shown against tritium also explains the gas barrier effect against gas atoms of larger volume (e.g., of the rare gases) and gas molecules such as $O_2$, $O_3$, $N_2$, CO, $CO_2$, $H_2O$, $SO_2$, $H_2S$, $NH_3$, $CH_4$), provided that the gas molecules are inert or form solids with aluminum, such as $Al_2O_3$ or $Al_2S_3$ as well as $AlO(OH)$. Aggressive gases, such as HF and $F_2$, form solid $AlF_3$ with the aluminum. When the solid formation occurs, the electro-Al barrier layer is superficially compacted. Hence, such chemical permeabilizing treatments can also be carried out intentionally and utilized for further compacting of the electro-Al layer.

With the aid of the above described T detection method, it is also readily possible to optimize the electro-Al gas barrier layer thickness, thus avoiding the deposition of unnecessarily thick electro-Al layers.

EXAMPLE 2

Electro-Al Gas Barrier Coating of Beam Waveguides, e.g. of Glass or Quartz Fibers, To Provide Protection Against the Interfering or Destructive In-Diffusion of Hydrogen and/or Water Vapor Molecules It is known that the beam waveguides made today are normally protected with plastic coatings against mechanical damage during installation and in use. These beam waveguides are sensitive to the intrusion of hydrogen and water vapor, because their functional properties of internal total reflection are adversely affected upon in-diffusion of these substances. Beam waveguides, therefore, can not be used in places where hydrogen is normally present such as in refineries, gas works and chemical, and particularly petrochemical installations. Since beam waveguide technology represents a safe, reliable and promising key technology in electrical engineering, the hydrogen problem is a significant restriction.

Organic plastics, have been used for wrapping glass or quartz fibers. However, plastics are generally permeable to hydrogen and water vapor and therefore cannot prevent $H_2$ and $H_2O$ from getting to the surface of the hydrophile glass or quartz fibers and then diffusing into them. Since the glass or quartz fibers have no surface electroconductivity, electroaluminum cannot be applied directly by electrochemical means.

For this reason, the beam waveguide glass or quartz fibers are first coated with a thin electroconductive metal or carbon layer, in immediate conjunction with their production by fiber drawing from the molten glass or quartz rod material. To this end, the freshly drawn, hot fiber is made to enter at the optimum surface temperature into a vapor or liquid jet of, for example, Al-$(iC_4H_9)_3$, $In(C_2H_5)_3$, $Ni(CO)_4$, $CH_3Au:P(CH_3)_3$ or n-heptane. By thermal degradation, a layer about 0.1 um thick will then deposit on the freshly formed fiber surface. The beam waveguide can then be electroplated in a continuous process on the electroconductive surface of the fiber.

To this end, as in the glass fiber or quartz fiber manufacturing technique already practiced today, the fiber is drawn vertically downward about 4 m and then guided over a guide roller or disk of about 30 cm diameter into the horizontal plane. In the fiber groove, the guide roller or disk is covered with silver-plated copper and cathodically loaded in the galvanic circuit of the electro-Al deposition; it constitutes the lower contacting point for the now conductive fiber. An upper cathodic contacting point is formed by two spring-supported sheet silver straps, opposite each other and somewhat offset in their gripping height, the straps being disposed below the apparatus for metal or carbon coating.

Just below the upper contacting point, the fiber enters the aluminum electroplating apparatus. The apparatus is shielded from the outside by a dry nitrogen stream. The apparatus terminates upwardly by an intensive cooler to avoid solvent losses and has at least one three-jet jet-electroplating unit, but preferably three or more units, arranged one below the other. Such a unit consists of three jet nozzles centrically arranged in one plane at angular distances of 120°. The jet nozzles consist of electrically nonconductive and chemically and thermally stable material, preferably Duran ® glass or ceramic. In the jet tubing, each jet nozzle has an electrode contacted to the outside, of inert material, e.g. special steel, silver or copper, and they can be fed with aluminum-organic electrolyte solution via a common circular conduit. For coating the fiber surface with electroaluminum, the circular conduit is supplied with electrolyte solution having a temperature of about 100° C. The solution is supplied from a tank by means of a magnetically driven impeller pump. The fiber is guided downward from above through the electrolyte jet in the center of the arrangement and coated with electroaluminum on all sides. The coating occurs under anodic load of the jet tube electrodes and high current densities of approximately 3 to 10 $A/dm^2$.

The three-jet jet electroplating unit is arranged centered in a cylindrical part which has a diameter of 200 mm and a height of about 120 mm. The electroplating unit terminates upwardly as well as downwardly with flat flanges which permit several of such units to be placed one on the other. The cylinder walls have a ground tubulature for insertion of the rotary jet circular conduit arrangement, with current feed for the three electrodes and a nipple for the electrolyte solution. At the same time the cylinder walls can be heated from the outside, to prevent cooling of the electrolyte.

On the uppermost three-jet jet electroplating unit, the previously mentioned unit consisting of an intensive cooler and nitrogen admission is placed as a termination of the aluminum-plating apparatus. The said cooler unit is firmly and tightly connected with the jet electroplating unit by means of a flat flange and by the usual flat flange screw unions.

In the same manner, there is fitted to the bottommost three-jet jet electroplating unit, by flat flange, an end unit. The end unit, having an installed height of 200 mm, is pot-shaped in order to collect the electrolyte solution splashing down from the jet nozzles and to return it into the heated electrolyte tank via a siphon. The electrolyte cycle is thus closed.

To allow for the downward passage of the fiber coated with electro-Al, the pot-shaped end part of the unit has a tube in its center which ends just below the flat flange plane and converges to a point upwardly like a nozzle. Below the pot-shaped part, the tube terminates with a similar nozzle orifice, so that the dry, oxygen-free nitrogen, introduced through a nipple on the side of the tube under slight excess pressure, shields the aluminum-plating apparatus from the external atmosphere and blows away electrolyte solution adhering to the coated fiber. Residual electrolyte still adhering is then washed away with solvent in a spray tube arranged therebelow, and the electro-Al surface of the fiber is then dried by blowing with warm air.

The draw-off speed of the fiber and the desired electro-Al layer thickness govern the required number of three-jet jet electroplating units to be arranged one above the other and/or the current densities to be applied. Experience has shown that electro-Al layers about 10 $\mu m$ thick are sufficient as a gas barrier layer and that compaction of the layer can be brought about by mechanical load on the ductile electro-Al layer on the guide rollers or disks.

Compaction of the aluminum layer simultaneously on all sides can also be brought about on the draw-plate principle. By structural deformation, it is also possible, at the same time, to achieve a strengthening of the layer without causing contamination thereof. To accomplish this, the Al-electroplated fiber is drawn, immediately after blow-drying and before the first guide roller or disk, through at least two draw-plates of polished hard material, for example, corundum or special steel, which mechanically smoothen and at the same time compact the electro-Al layer in fine gradations. Due to the high ductility of the high-purity electroaluminum, this can be done successfully without straining the tensile strength of the fiber so that the electroaluminum demonstrates its good self-lubricating property.

The effect of the gas barrier of the electro-Al coating against hydrogen or water vapor, or any mixtures of these two gases, can be determined as a function of concentration, residence or contact time, and temperature in a test chamber, based on the constance or change of the optical properties, in particular the total reflection quality or attenuation and dispersion of various light wavelengths. To accomplish this, first a sufficiently great length of uncoated fiber material, possibly coiled (loose spirals to allow access of gas on all sides), is exposed in a test chamber to a hydrogen atmosphere or water vapor or a mixture of the two gases (defined quantities) at a fixed chamber temperature. The fiber material is guided to the outside of the chamber, under seal, via the fiber ends (which are protected against the ambient air by a thicker aluminum tubule). The changes in the optical properties are recorded as a function of time. After a relatively large range of variation has been observed, the chamber temperature is raised, for example, from 25° C. to 60° C. and again the occurring change in the optical properties is recorded. In this manner, a clear picture of the disturbing influence of the in-diffusing hydrogen is obtained, which (picture) can be further intensified by still higher chamber temperatures.

Then, similar lengths or coils of fiber material which has been coated with 5, 10 and 15 $\mu m$ electroaluminum, respectively, are placed in the test chamber and their change in optical properties recorded in the manner described above. It is found that an electro-Al coating of as thin as 5 μm has a considerable protective effect and substantially slows the indiffusion of hydrogen, but this layer thickness is not sufficient for a total gas barrier. A layer thickness of 10 μm, however, is sufficient, and 15 μm will ensure an additional long-term safety, which can be further enhanced by the above described smoothing and compacting step. Optimization of the electro-Al layer thickness can therefore be easily determined by measurement.

By using the above-described test chamber and recording the change in optical properties of uncoated fibers and fibers coated with electroaluminum, in different thicknesses, it can be seen that the harmful influence of water vapor can be avoided by the gas barrier effect. An electro-Al layer thickness of 8 um provides excellent protection for the fibers thereby preserving their optical properties.

During the actual use of beam waveguides, moisture (H₂O) and hydrogen are present simultaneously. Since the water vapor content of the atmosphere supports the penetration or diffusion of the hydrogen, it is preferable to use electro-Al coatings of 10 to 20 μum, with a subsequent smoothing and compacting of the applied electro-Al layer, preferably by means of "draw-plate" technique, to enhance the gas barrier protective effect, so that full protection can be obtained with thinner primary-applied electro-Al layers.

What is claimed is:

1. A metallic material or a nonmetallic material with an electroconductive surface having a gas barrier layer on an electroconductive surface thereof, said gas barrier layer being an electroplated aluminum layer having a purity of greater than 99.99% aluminum.

2. A material according to claim 1, wherein the electroplated aluminum layer has a thickness of 10 to 20 μm.

3. A material according to claim 1, wherein the electroplated aluminum layer is compacted mechanically or chemically.

* * * * *